United States Patent [19]

Coffinberry

[11] Patent Number: 5,202,525
[45] Date of Patent: Apr. 13, 1993

[54] SCRAMJET ENGINE HAVING IMPROVED FUEL/AIR MIXING

[75] Inventor: George A. Coffinberry, West Chester, Ohio

[73] Assignee: General Electric Company, Cincinnati, Ohio

[21] Appl. No.: 471,588

[22] Filed: Jan. 29, 1990

[51] Int. Cl.$^5$ ............................................. C06D 5/04
[52] U.S. Cl. ..................... 60/218; 60/39.462; 60/270.1
[58] Field of Search ............... 60/39.462, 270.1, 218, 60/205, 204

[56] References Cited

U.S. PATENT DOCUMENTS

| | | |
|---|---|---|
| 3,430,446 | 3/1969 | McCloy . |
| 3,667,219 | 6/1972 | Murfree, Jr. et al. ............. 60/39.46 |
| 3,811,280 | 5/1974 | Wharton et al. ...................... 60/207 |
| 3,812,672 | 5/1974 | Escher ................................ 60/270.1 |
| 3,910,037 | 10/1975 | Salkeld .................................. 60/250 |
| 3,974,648 | 8/1976 | Kepler ................................... 60/204 |
| 4,194,519 | 3/1980 | Baker et al. ......................... 137/15.1 |
| 4,214,442 | 7/1980 | Reingold ............................ 60/270 R |
| 4,369,940 | 1/1983 | Kelly et al. ........................ 244/3.21 |
| 4,381,017 | 4/1983 | Bissinger ............................ 137/15.1 |
| 4,477,039 | 10/1984 | Boulton et al. ..................... 244/53 B |
| 4,771,599 | 9/1988 | Brown et al. ......................... 60/258 |
| 4,817,892 | 4/1989 | Jeneke .................................. 244/15 |
| 4,821,512 | 4/1989 | Guile et al. ......................... 60/270.1 |
| 4,841,724 | 6/1989 | Hall et al. ............................. 60/245 |

Primary Examiner—Michael J. Carone
Attorney, Agent, or Firm—Jerome C. Squillaro

[57] ABSTRACT

An improved method of operating a scramjet engine for powering an aircraft at supersonic velocity is disclosed. The method includes the steps of providing supersonic compressed airflow in a combustor, supplying fuel to the compressed airflow in the combustor, and providing a monopropellant adjacent to the airflow and the fuel. The monopropellant is effective for expanding in the combustor for mixing the airflow and the fuel for combustion of the airflow and fuel for generating combustion gases. In a preferred embodiment of the invention, the monopropellant is hydrazine and is effective for obtaining a specific volumetric increase of about 20,000:1. An apparatus for carrying out the method of the invention is also disclosed.

20 Claims, 2 Drawing Sheets

SCRAMJET ENGINE HAVING IMPROVED FUEL/AIR MIXING

BACKGROUND OF THE INVENTION

The present invention relates generally to supersonic combustion ramjets (i.e., scramjets), and more particularly, to a scramjet engine having improved mixing of fuel and air.

A scramjet engine typically powers an aircraft at relatively high supersonic, or hypersonic, velocities in freestream, or ambient air. The scramjet engine is conventionally designed for receiving supersonic freestream airflow and channeling such airflow at supersonic velocity through the scramjet engine. The supersonic ambient airflow is typically compressed internally in the scramjet engine in an inlet thereof which is typically a supersonic diffusor. The ambient airflow may be initially externally compressed by shockwaves generated off the aircraft's bow by recompression before entering the inlet.

The supersonic compressed airflow is channeled through the inlet and into a combustor where it is mixed with fuel, such as hydrogen, for combustion. Combustion gases generated in the combustor are discharged through a conventional exhaust nozzle for powering the aircraft at hypersonic velocities up to about Mach 18, for example.

Mixing of the fuel, such as for example hydrogen, and air in the scramjet combustor is a difficult process since the compressed airflow is flowing at supersonic velocity with substantial momentum, and the fuel injected into the combustor has relatively low momentum. Oxygen and nitrogen molecules contained in the airflow have relatively large mass inertia which typically easily overcome the relatively low mass inertia of molecular hydrogen in the fuel. Accordingly, hydrogen fuel has the tendency to simply follow the stream of supersonic airflow without significant mixing. In order for obtaining acceptable combustion in the scramjet combustor, acceptable mixing of the fuel and supersonic airflow must be obtained.

It is not believed that a scramjet-powered aircraft has yet been built or flown. However, small research-type scramjet engines have been built and laboratory tested at simulated flight speeds up to about Mach 7. Accordingly, the references herein to conventional and typical scramjets and structures refers to information conventionally known to those skilled in the art of engines for powering aircraft at supersonic velocity, which is based, in part, on mathematical modeling and analysis.

OBJECTS OF THE INVENTION

Accordingly, one object of the present invention is to provide a new and improved scramjet engine.

Another object of the present invention is to provide a new and improved method of operating a scramjet engine for improved fuel and air mixing.

Another object of the present invention is to provide a scramjet engine having improved fuel and air mixing.

Another object of the present invention is to provide a scramjet engine which provides improved fuel and air mixing, and ignition thereof.

SUMMARY OF THE INVENTION

An improved method of operating a scramjet engine for powering an aircraft at supersonic velocity is disclosed. Also disclosed is an improved scramjet engine for carrying out the improved method. The method includes the steps of providing supersonic compressed airflow from an inlet to a combustor of the engine and supplying fuel to the compressed airflow in the combustor. The method also includes providing a monopropellant in the combustor adjacent to the compressed airflow and the fuel, the monopropellant being effective for expanding in the combustor for mixing the airflow and the fuel for combustion of the airflow and fuel for generating combustion gases. The combustion gases are discharged from the combustor through an exhaust nozzle for powering the aircraft. In a preferred, exemplary embodiment, the monopropellant is hydrazine which vaporizes and decomposes for providing up to about a 20,000:1 volume increase for effectively mixing the fuel and airflow provided in the combustor.

BRIEF DESCRIPTION OF THE DRAWING

The novel features believed characteristic of the invention are set forth and differentiated in the claims. The invention, in accordance with a preferred, exemplary embodiment, together with further objects and advantages thereof, is more particularly described in the following detailed description taken in conjunction with the accompanying drawing in which:

DETAILED DESCRIPTION

Figure 1:
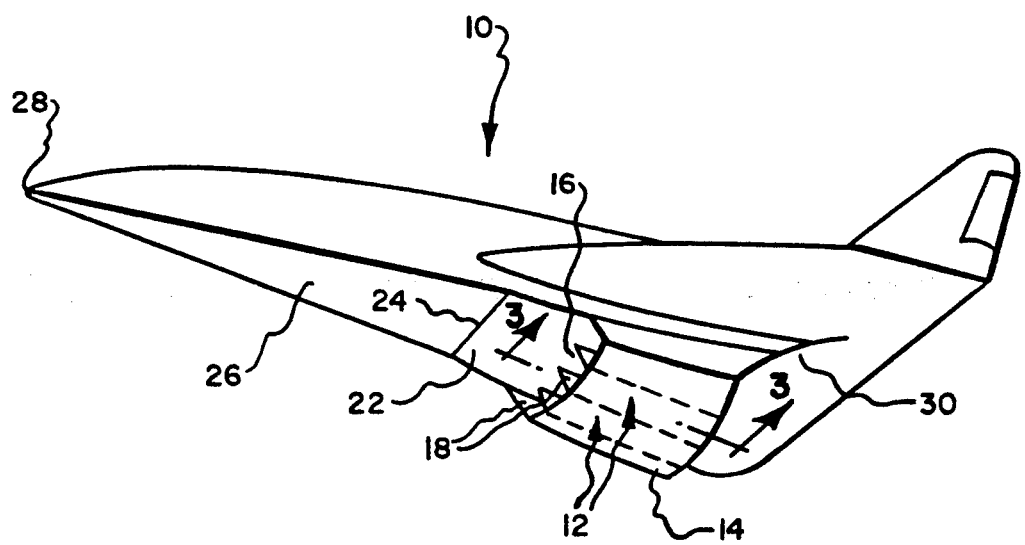
FIG. 1 is a schematic, perspective view of a hypersonic aircraft powered by scramjet engines in accordance with a preferred embodiment.

Illustrated in FIG. 1 is a schematic representation of an aircraft 10 including four side by side scramjet engines 12 in accordance with a preferred, exemplary embodiment of the present invention. Although four scramjet engines 12 are disclosed, either fewer or more substantially identical scramjet engines 12 may be utilized for powering the aircraft 10 at hypersonic speeds up to about Mach 18.

Figure 2:
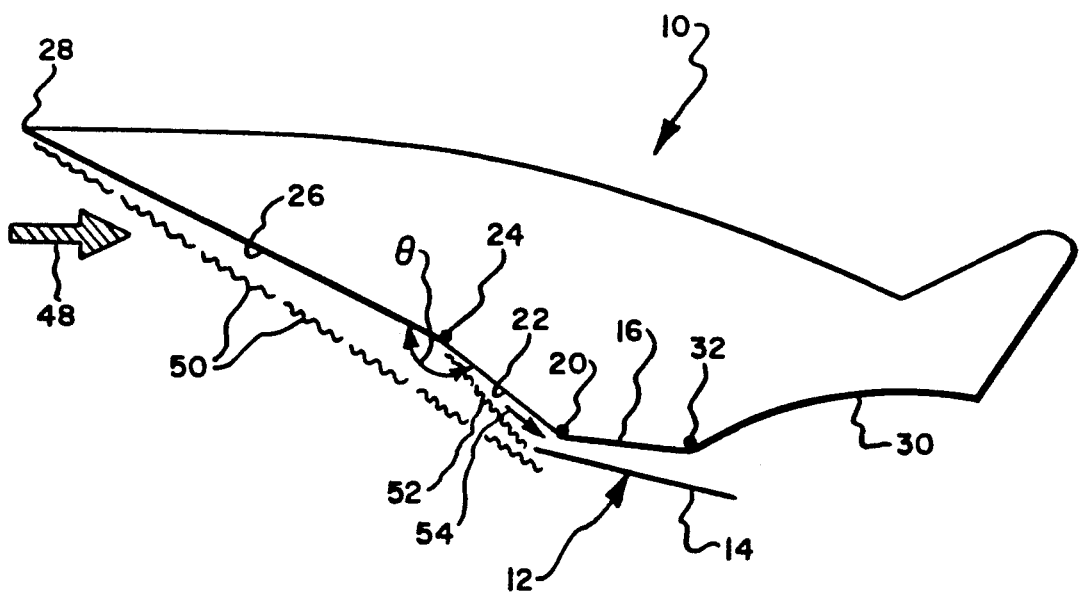
FIG. 2 is a schematic sectional view of the aircraft illustrated in FIG. 1.

Referring to both FIGS. 1 and 2, the scramjet engine 12 includes a cowl 14 spaced from a midbody surface 16 of the aircraft 10. A pair of sidewalls 18 extends from the midbody surface 16 to the cowl 14 to define a generally rectangular scramjet engine. Five sidewalls 18 are disclosed for defining four substantially identical side by side positioned scramjet engines 12.

Extending upstream from a forward end 20 of the midbody surface 16 and inclined relative thereto is a planar forebody surface 22. Extending upstream from the forebody surface 22 from an inflection point 24 is a planar bow surface 26 which extends to a leading edge 28 of the aircraft 10. The bow surface 26 is disposed at an obtuse angle $\theta$ from the forebody surface 22. An arcuate aftbody surface 30 extends downstream from a downstream end 32 of the midbody surface 16.

Figure 3:
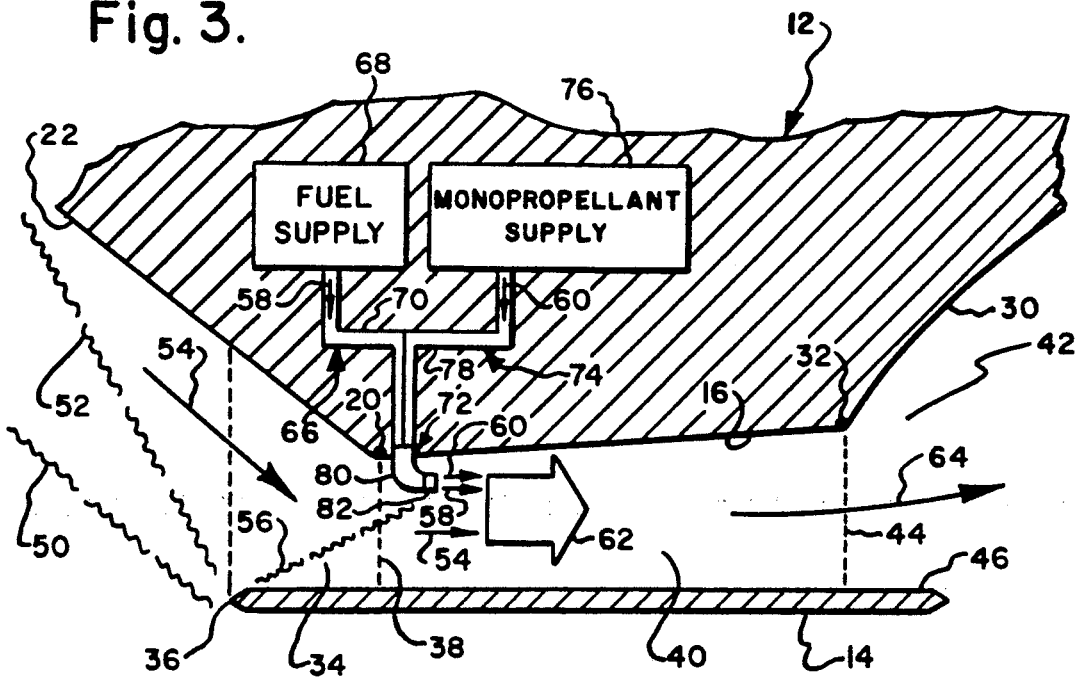
FIG. 3 is an enlarged, partly sectional, schematic view of a scramjet engine taken along line 3—3 in FIG. 1.

As illustrated in FIG. 3, the cowl 14 of the scramjet engine 12 is spaced from the forebody surface 22, midbody surface 16 and aftbody surface 30 to define in serial flow communication an inlet 34 extending downstream from a leading edge 36 of the cowl 14 to the midbody forward end 20; a throat 38 of minimum cross sectional flow area at the plane of the midbody forward end 20; a combustor 40 extending downstream from the throat 38; and an exhaust nozzle 42 extending downstream from the combustor 40 at a combustor outlet 44 defined in the plane of the midbody downstream end 32. The inlet 34 is a conventional supersonic diffusor defining a converging channel. The midbody surface 16 and cowl 14 define the combustor 40 as being a diverging channel. And, the exhaust nozzle 42 is defined in part by the aftbody surface 30 and a downstream end 46 of the cowl 14 and is a diverging channel.

Referring again to FIG. 2, when the aircraft 10 operates at hypersonic velocity, such as, for example at about Mach 18, freestream or ambient airflow 48 flows over the aircraft 10 and an oblique, bow shockwave 50 is formed and extends from the leading edge 28. An oblique forebody shock 52 is also formed and extends from the inflection point 24. The bow and forebody shocks 50 and 52 provide recompression of the airflow 48 to provide external compression thereof prior to being channeled into the scramjet inlet 34 as supersonic compressed airflow 54. The inlet 34 further compresses the supersonic compressed airflow 54 which changes its direction from being generally parallel to the forebody surface 22 to being generally parallel to the cowl 14 with an attendant oblique cowl shock 56 extending rearwardly from the cowl leading edge 36 in the inlet 34 and combustor 40, as illustrated in FIG. 3.

In accordance with a preferred, exemplary embodiment of the present invention, an improved method of operating the scramjet engine 12 for powering the aircraft 10 at supersonic and hypersonic velocity includes the steps of providing the supersonic compressed airflow 54 from the inlet 34 to the combustor 40 and supplying fuel 58 to the compressed airflow 54 in the combustor 40. The method further includes the step of providing a monopropellant 60, which in a preferred embodiment is hydrazine, in the combustor 40 adjacent to the compressed airflow 54 and the fuel 58. The monopropellant 60 is effective for being expanded in the combustor 40 for mixing the airflow 54 and fuel 58 for generating a fuel/air mixture 62 for combustion to generate combustion gases 64. The method further includes the step of discharging the combustion gas 64 from the combustor 40 through the exhaust nozzle 42 for powering the aircraft 10.

More specifically, and as illustrated in FIG. 3, the scramjet engine 12 further includes means 66 for supplying the fuel 58 to the compressed airflow 54 in the combustor 40. The fuel supply means 66 includes a conventional fuel supply 68 including a fuel pump in flow communication with a conventional fluid conduit 70. The fluid conduit 70 is in flow communication with a fuel injector 72 extending into the combustor 40 adjacent to the forward end 20 of the midbody surface 16. Although one fuel injector 72 is illustrated, one or more fuel injectors 72 may be used as desired.

The fuel 58, such as hydrogen, is initially supplied in a liquid state, which is relatively cold. As it flows through the conduit 70, it is used to cool adjacent engine and aircraft structures, and thus is heated to a gaseous state upon reaching the fuel injector 72.

The scramjet engine 12 further includes means 74 for providing the monopropellant 60 in the combustor 40 adjacent to the compressed airflow 54 and the fuel 58. The monopropellant supplying means 74 includes a conventional monopropellant supply 76 includes a monopropellant pump in flow communication with a conventional fluid conduit 78. The fluid conduit 78 is suitably connected in flow communication with the injector 72 which is shared in common with the fuel supplying means 66.

The fuel injector 72 includes a base end 80 suitably supported in the midbody surface 16 and extending radially inwardly into the combustor 40. Fuel injector 72 also includes a tip 82 extending in flow communication from the base 80. The fuel injector tip 82 includes a longitudinal centerline axis 84, a first tubular passage 86 disposed coaxially with the centerline axis 84, and a second tubular passage 88 surrounding the first passage 86 and being coannular therewith and coaxial relative to the longitudinal axis 84. The injector tip 82 and the centerline axis 84 are disposed in the combustor 40 parallel to the flow direction of the airflow 54. The injector first passage 86 is suitable connected in flow communication with the fluid conduit 78 in the injector base end 80. The second passage 88 is suitable connected in flow communication with the fuel conduit 70 in the injector base end 80. With this construction, the monopropellant supplying means 74 supplies the monopropellant 60 to the injector first passage 86, and the fuel supplying means 66 supplies the fuel 58 to the injector second passage 88.

As illustrated in FIG. 3, the injector tip 82 is disposed adjacent to and is spaced from the midbody surface 16 of the combustor 40 and parallel to the compressed airflow 54. As additionally illustrated in FIG. 4, by spacing the injector tip 82 from the midbody surface 16, the compressed airflow 54 flows parallel to the circumferential outer surface 90 of the injector tip 82.

Figure 4:
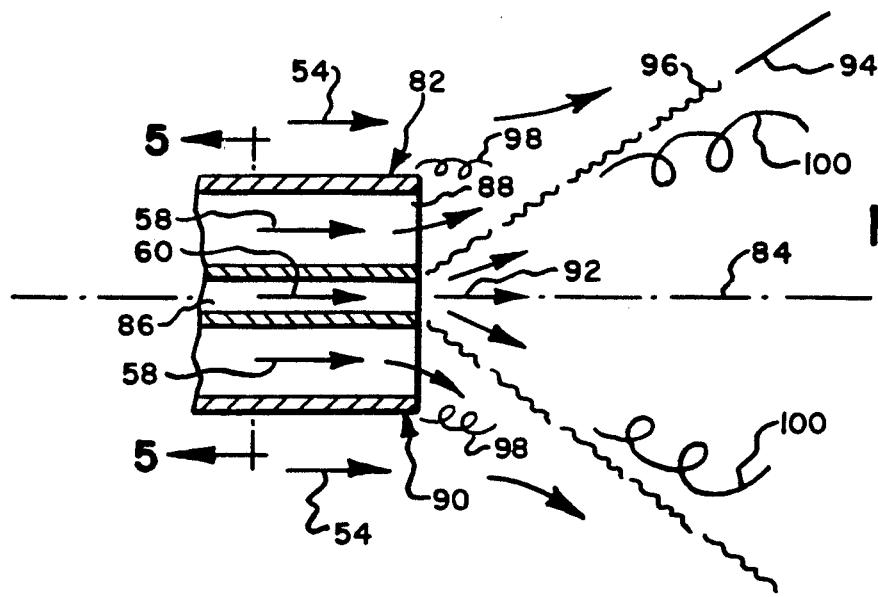
FIG. 4 is a side, sectional view of a tip of a fuel injector supplying fuel to a combustor in the scramjet engine illustrated in FIG. 3.

As described above, when hydrogen is used as the fuel 60 for powering the aircraft 10 at hypersonic velocity, the fuel 60 conventionally has a tendency to simply follow the stream of the supersonic compressed airflow 54 without substantial mixing. This is due in part to the relatively large mass inertia of the oxygen and nitrogen molecules in the airflow 54 which substantially overcome the relatively low mass inertia of the molecular hydrogen contained in the fuel 60. FIG. 4 illustrates the improved method for mixing the fuel 60 with the airflow 54 in accordance with one embodiment of the present invention. Due to compression, the compressed airflow 54 is provided to the combustor 40 at a first temperature of about 2000° R. or higher. The monopropellant 60, such as hydrazine in the preferred embodiment is supplied in the combustor 40 adjacent to the compressed airflow 54 at the first temperature of about 2000° R. The monopropellant 60 is therefore heated by the airflow 54.

The monopropellant fuel 60 is preferably provided in a liquid state so that it may be vaporized to a gaseous state upon discharge from the first passage 86 for increasing its specific volume for expanding the monopropellant fuel 60. Liquid hydrazine has a boiling point of about 696° R. at one atmosphere of pressure. The pressure of the airflow 54 in the combustor 40 is conventionally about one-quarter to one atmosphere and, therefore, the boiling point of hydrazine monopropellant 60 is substantially below the temperature of the compressed airflow 54. Accordingly, the hydrazine fuel 60 readily vaporizes upon leaving the first passage 86 which expands the monopropellant 60. The monopropellant 60 is heated by the airflow 54 for raising its temperature to first temperature of the airflow 54 for further expanding the monopropellant 60. This results in a specific volume increase of the hydrazine monopropellant due to vaporization and heating of about 3333:1.

A monopropellant, such as hydrazine, is used since it is self-decomposing and is not limited by being required to mix with an oxidizer. At the 2000° R. temperature of the airflow 54, one mole of the hydrazine ($N_2H_4$) decomposes to three moles of hydrogen $H_2$ and nitrogen $N_2$ releasing heat for further temperature increase to about 4000° R. The monopropellant 60 in its gaseous state has a volume which may be represented by a mole unit volume which is decomposed into the components hydrogen $H_2$ and nitrogen $N_2$, with the components having a greater collective volume of three moles compared to the unit one mole volume of the gaseous hydrazine. This results in an additional specific volume increase of the monopropellant 60 of 3:1.

The decomposition reaction of the hydrazine monopropellant 60 releases heat for heating the monopropellant components hydrogen $H_2$ and nitrogen $N_2$ from the first temperature of about 2000° R. to a second, higher temperature of about 4000° R. for further expanding the monopropellant component 92. Since the higher heated temperature of about 4000° R. is 2000° R. greater than the initial temperature of 2000° R., the monopropellant components 92 are expanded for obtaining a specific volume increase of about 2:1 since expansion of gas is directly proportional to increase in temperature. Accordingly, the decomposition of the hydrazine and heating thereof results in a specific volume increase of the gaseous monopropellant fuel 60 of 6:1. The overall specific volume increase of the liquid hydrazine monopropellant 60 to the gaseous components hydrogen $H_2$ and nitrogen $N_2$ at temperatures of 4000° R. is about 20,000:1 (i.e., 3333:1 times 6:1). This substantial volumetric increase provides effective mixing of the fuel 58 and the airflow 54.

More specifically, the monopropellant 60 decomposes for expanding the components hydrogen and nitrogen at the speed of sound which expands outwardly toward the adjacent streams of the fuel 60 and the airflow 54 as illustrated in FIG. 4. The monopropellant decomposition components are designated by the numeral 92 in FIG. 4. The large volume increase of the components 92 which propagate radially outwardly from the centerline axis 84 toward the adjacent coannular streams of the fuel 58 and the airflow 54 creates a fluid wall 94 which is effective for turning and thereby mixing together the fuel 58 and the airflow 54. The fuel 58 is ejected from the second passage 88 either supersonically or subsonically, with supersonic ejection being preferred for creating an oblique conical shockwave 96 extending downstream from the first passage 86. The fluid wall 94 causes the oblique shockwave 96 to form between both the fuel 58 and airflow 54 and the monopropellant 60, i.e., the monopropellant components 92.

Initial mixing of the fuel 58 and the airflow 54 due to the effects of the fluid wall 94 are shown as a first mixing stream 98 in FIG. 4. The additional, substantial mixing of the airflow 54 and the fuel 58 at the fluid wall 94 of the expanding monopropellant components 92 is illustrated by the mixing streams 100.

Figure 5:
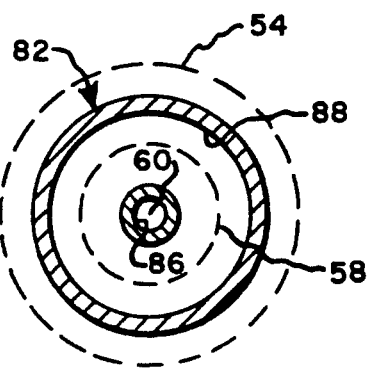
FIG. 5 is a transverse sectional view of the injector tip illustrated in FIG. 4 taken along line 5—5.

Accordingly, the method in accordance with the preferred embodiment of the present invention further includes the steps of injecting the monopropellant 60 into the combustor 40 from the injector tip passage 64 generally parallel to the compressed airflow 54 as illustrated in FIGS. 4 and 5. The method further includes injecting the fuel 58 from the annular second passage 88 in an annulus around the monopropellant 60 injected from the first passage 86, then channeling the airflow 54 around the annular outer surface of the injector tip 82 in an annulus around both the fuel 58 and the monopropellant 60.

By injecting the fuel 58 at supersonic velocity, a strong oblique shockwave 96 will be generated for increasing the mixing of the fuel 58 and the airflow 54. Alternatively, the fuel 58 may be injected at subsonic velocity and a similar shockwave 96 will be generated due to the interaction of the supersonic compressed airflow 54 with the subsonic fuel 58 and the monopropellant components 92 providing for mixing of the fuel 58 and the airflow 54 at increased levels less than those associated with the injection of supersonic fuel 58.

Since the temperature of the monopropellant component 92 in the fluid boundary 94 is about 4000° R., it is substantially greater than the 2000° R. temperature of the airflow 54 which will thus provide for spontaneous ignition of the fuel 58 and the airflow 54 in the region of the fluid wall 94.

Accordingly, the use of a monopropellant 60 such as hydrazine provides a new method and apparatus for a scramjet engine for providing effective mixing of the fuel 58 and the airflow 54. The substantial volumetric expansion of the monopropellant 60 from a liquid to a decomposed state, including heating thereof, at substantially instantaneous, detonation-rate of expansion provides effective fuel/air mixing.

While there have been described herein what are considered to be preferred embodiments of the present invention, other modifications of the invention shall be apparant to those skilled in the arts from the teachings herein, and it is, therefore, desired to be secured in the appended claims all such modifications as fall within the true spirit and scope of the invention.

More specifically, and for example only, other monopropellants may be utilized. Hydrazine is preferred for its effective ability for large volumetric expansion at relatively high rates as above described. It is also preferred because it is a relatively stable monopropellant. Other monopropellants such as hydrogen azide $HN_3$ may be more effective for volumetric expansion than hydrazine. However, hydrogen azide is less stable. Furthermore, various structures for supplying the fuel and monopropellants in a combustor may be utilized for practicing the method of the present invention. Whereas a fuel injector having a tip disposed for injecting the fuel and monopropellant parallel to the supersonic compressed airflow is preferred, the fuel and monopropellant may be injected into the combustor normal or obliquely to the supersonic compressed airflow.

Accordingly, what is desired to be secured by letters patent of the United States is the invention as defined and differentiated in the following claims.

I claim:

1. A method of operating a scramjet engine for powering an aircraft at supersonic velocity, said engine including in serial flow communication an inlet, combustor and exhaust nozzle, comprising the steps of:
providing supersonic compressed airflow from said inlet to said combustor;
supplying fuel to said compressed airflow in said combustor;

providing a monopropellant in said combustor adjacent to said compressed airflow and said fuel, said monopropellant being effective for expanding in said combustor for mixing said airflow and said fuel for combustion of said airflow and said fuel to generate combustion gases; and discharging said combustion gases from said combustor through said exhaust nozzle for powering said aircraft.

2. A method according to claim 1 wherein said compressed airflow is provided at a first temperature and said monopropellant is caused to expand by being provided adjacent to said airflow at said first temperature.

3. A method according to claim 2 wherein said airflow first temperature is about 2000° R. and said monopropellant is hydrazine.

4. A method according to claim 2 further including providing said monopropellant in a liquid state and vaporizing said liquid monopropellant to a gaseous state for expanding said monopropellant.

5. A method according to claim 4 wherein said airflow first temperature is about 2000° R. and said monopropellant is hydrazine.

6. A method according to claim 4 wherein said liquid monopropellant has a boiling point below said first temperature and said liquid monopropellant is heated by said airflow for raising its temperature to said first temperature for further expanding said monopropellant.

7. A method according to claim 6 wherein said monopropellant is vaporized and heated for obtaining an increase of specific volume of about 3333:1.

8. A method according to claim 6 further including the step of decomposing said gaseous monopropellant for expanding said monopropellant.

9. A method according to claim 8 wherein said monopropellant has a volume and is decomposed into components, said components having a greater volume collectively than said monopropellant volume.

10. A method according to claim 9 wherein said component collective volume is about three times said monopropellant volume.

11. A method according to claim 9 wherein said monopropellant is decomposed and releases heat for heating said monopropellant from said first temperature to a second, higher temperature for expanding said monopropellant component.

12. A method according to claim 11 wherein said higher temperature is about 2000° R. greater than said first temperature and said monopropellant components are expanded for obtaining a specific volume increase of about 2:1.

13. A method according to claim 11 wherein said monopropellant decomposes for expanding said components at the speed of sound.

14. A method according to claim 13 wherein said monopropellant is hydrazine.

15. A method according to claim 13 further including the step of providing said monopropellant adjacent to said fuel and said compressed airflow so that said expanding monopropellant acts as a fluid wall for turning and thereby mixing said fuel and said compressed airflow.

16. A method according to claim 15 wherein said fluid wall causes an oblique shockwave to form between both said fuel and airflow and said monopropellant.

17. A method according to claim 16 further including the steps of:

injecting said monopropellant into said combustor generally parallel to said compressed airflow;

injecting said fuel in an annulus around said monopropellant and generally parallel thereto; and channeling said airflow in an annulus around both said fuel and said monopropellant.

18. A method according to claim 2 further including the step of providing said monopropellant adjacent to said fuel and said compressed airflow so that said expanding monopropellant acts as a fluid wall for turning and thereby mixing said fuel and said compressed airflow.

19. A method according to claim 18 wherein said fluid wall causes an oblique shockwave to form between both said fuel and airflow and said monopropellant.

20. A method according to claim 2 further including the steps of:

injecting said monopropellant into said combustor generally parallel to said compressed airflow;

injecting said fuel in an annulus around said monopropellant and generally parallel thereto; and channeling said airflow in an annulus around both said fuel and said monopropellant.

* * * * *